(12) United States Patent
Tatamiya

(10) Patent No.: US 6,360,062 B1
(45) Date of Patent: Mar. 19, 2002

(54) BACKUP BATTERY STORING STRUCTURE FOR A CAMERA

(75) Inventor: Hisashi Tatamiya, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,781

(22) Filed: Dec. 20, 1999

(30) Foreign Application Priority Data

Dec. 21, 1998 (JP) .............................. 10-362884

(51) Int. Cl.$^7$ ................................. G03B 17/02
(52) U.S. Cl. ........................ 396/538; 396/539
(58) Field of Search ..................... 396/525, 535, 396/538, 539, 207, 208

(56) References Cited

U.S. PATENT DOCUMENTS

| | | | |
|---|---|---|---|
| 3,705,537 A | * 12/1972 | Paglia | 396/539 |
| 3,754,453 A | * 8/1973 | Ernisse et al. | 396/539 |
| 5,077,572 A | 12/1991 | Morisawa | 354/484 |
| 5,555,061 A | * 9/1996 | Soshi et al. | 354/288 |
| 5,682,571 A | * 10/1997 | Balling | 396/538 |
| 5,752,087 A | * 5/1998 | Sangregory | 396/539 |
| 5,799,223 A | * 8/1998 | Konishi et al. | 396/538 |
| 5,804,332 A | 9/1998 | Shimizu et al. | 429/100 |
| 5,915,134 A | 6/1999 | Arai et al. | 396/208 |

* cited by examiner

Primary Examiner—Christopher E. Mahoney
(74) Attorney, Agent, or Firm—Greenblum & Bernstein, P.L.C.

(57) ABSTRACT

A backup battery storing structure is arranged such that a plurality of DX pieces for reading a DX code on a film cartridge are arranged in the axial direction of the film cartridge along the wall of a film chamber of a camera, and a backup battery with a disc-like shape is stored between two adjacent DX pieces.

13 Claims, 5 Drawing Sheets

BACKUP BATTERY STORING STRUCTURE FOR A CAMERA

BACKGROUND OF THE INVENTION

The present invention relates to a camera equipped with a backup battery, and more specifically, to a backup battery storing structure in a camera.

A clock circuit for controlling the date and the time is used in a date mechanism of a camera for printing the date and the time on a part of a photographed image. A battery is necessary for driving the clock circuit. However, if the clock circuit is driven by a battery (a main battery) for a photographing function control circuit, the clock is stopped at the time of replacing the main battery. Therefore, a backup battery in addition to the main battery is provided in a camera.

However, this arrangement requires two spaces for respectively storing the main battery and the backup battery in the camera, and thus hinders downsizing of the camera.

SUMMARY OF THE INVENTION

In light of the above-mentioned circumstances, an object of the invention is to store a backup battery without increasing the space to be occupied in a camera.

In order to solve the above-mentioned problem, in a backup battery storing structure for a camera according to the invention, a plurality of DX pieces for reading a DX code on a film cartridge is arranged in the axial direction of the film cartridge along the wall of a film chamber of a camera, and a backup battery is stored between two adjacent DX pieces.

Since the back up battery is stored in the space for installing the DX pieces along the wall of the film chamber, the space occupied by the backup battery does not need to be increased in the camera Specifically, by bending the DX pieces in the axial direction, space for storing the backup battery is ensured. Moreover, by providing the thickness of the backup battery thinner than the flexure stroke of the DX pieces, the backup battery can be completely stored in the space occupied by the DX pieces, in the thickness direction thereof.

The present disclosure relates to the subject matter contained in Japanese patent application No. Hei. 10-362884 (filed on Dec. 21, 1998), which is expressly incorporated herein by reference in its entirety.

DESCRIPTION OF THE PREFERRED EMBODIMENT

Figure 1:
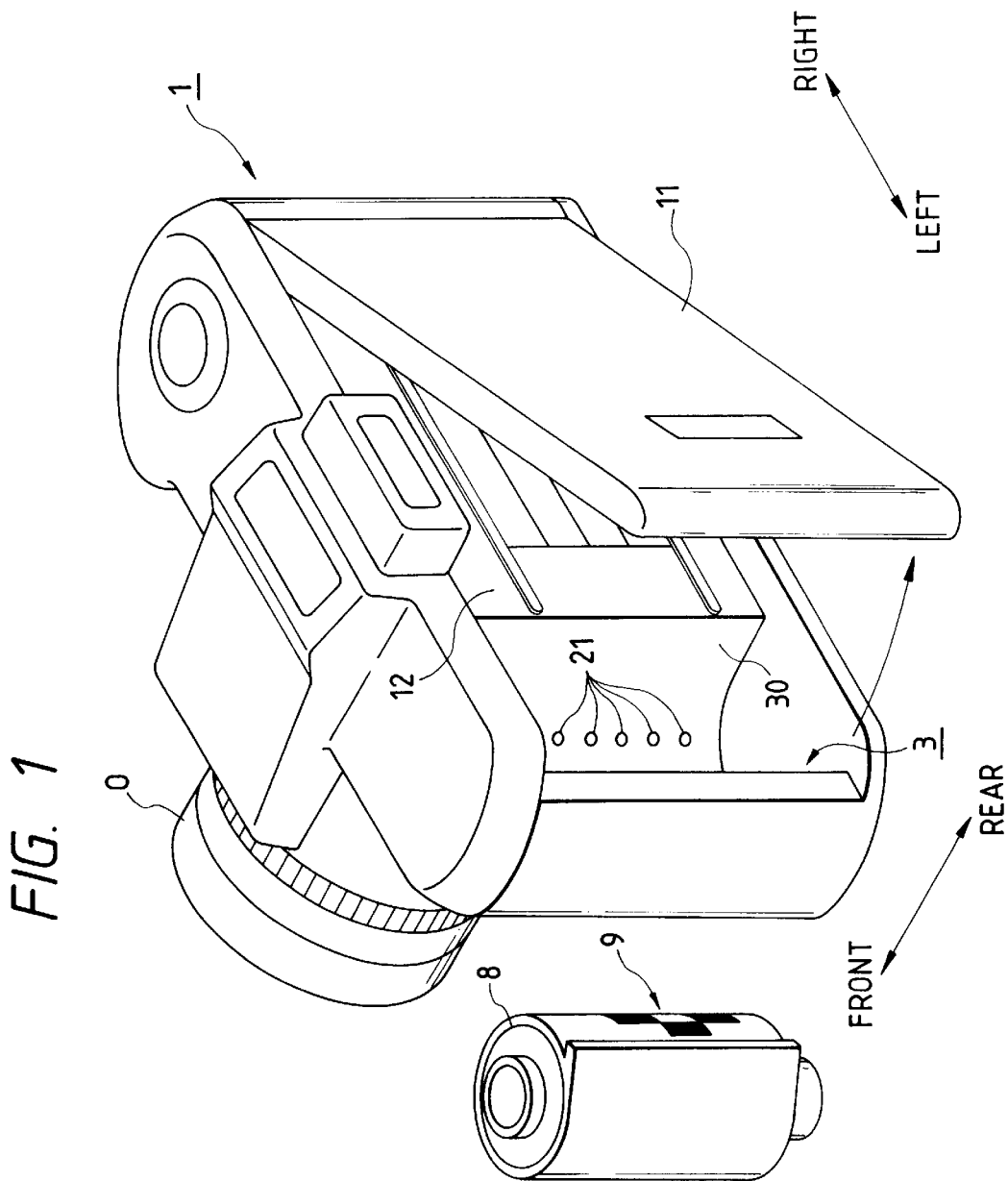
FIG. 1 is a perspective view showing the external appearance of a camera of an embodiment.

FIG. 1 is a perspective view showing a camera 1 of an embodiment, with a back lid 11 opened. In the following explanation, the objective lens (in the figures, it is marked as O) side of the camera 1 is defined to be the "front" side, and the back lid 11 side is defined to be the "rear" side Further, the "left" side and the "right" side are defined to be in the direction viewed from the rear of the camera 1.

A film chamber 3 for storing a film cartridge 8 is provided on the left side of main body 12 of the camera 1. A film chamber 3 is a vertically elongated space defined in the-front-to-rear direction by a curved wall 30 formed in the main body 12 and a part of the back lid 11. A film cartridge 8 is accommodated in the film chamber 3 with the axial direction thereof oriented vertically when holding the camera in an upright position. Moreover, a DX code 9 having a pattern indicative of the film information, such as sensitivity and number of the frames, is provided on the outer surface of the film cartridge 8. The DX code 9 has a conductive portion and a non-conductive portion.

Figure 2:
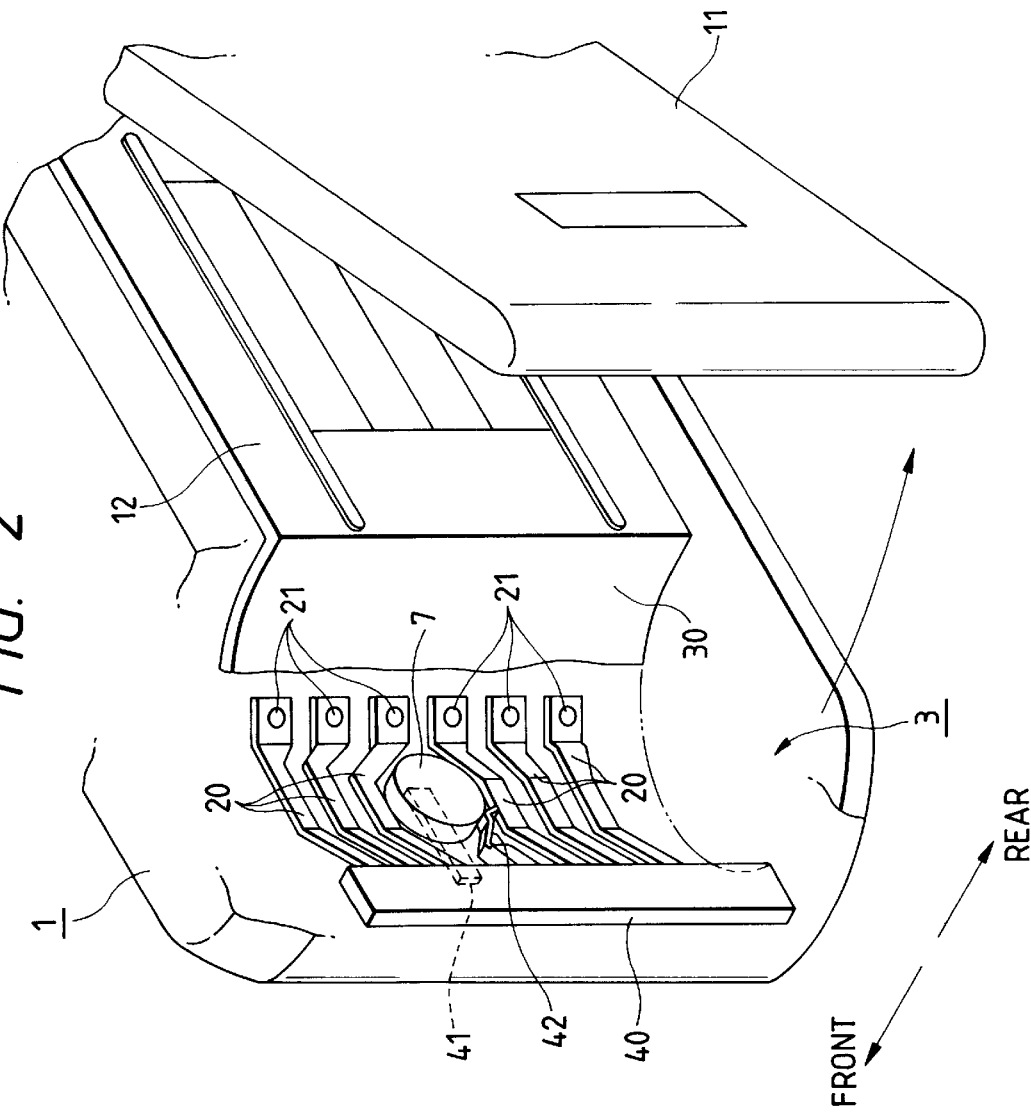
FIG. 2 is an enlarged perspective view of a film chamber of the camera of FIG. 1.

FIG. 2 is a diagram showing the film chamber 3 of the camera 1, with a part of the wall 30 broken. Six DX pieces 20 are provided on the opposite side (front side) of the wall 30 of the film chamber 3 for reading the DX code 9 on the cartridge 8. Each of the DX pieces 20 is in the form of a strip-like conductive member that has a projection 21 on a distal end thereof (shown at the right when viewing FIGS. 1 and 2) The pieces 20 extend in a circumferential (i.e., horizontal) direction along the wall 30 of the film chamber 3. Each projection 21 protrudes into the film chamber 3 through a through hole (not illustrated) formed in the wall 30, as shown in FIG. 1

Proximal ends of each of the six DX pieces 20 are fixed to a common terminal plate 40 (shown at the left when viewing FIG. 2). DX pieces 20 are designed to generate a signal if two pieces selected from the six DX pieces 20 are made electrically conductive For example, when the first and second DX pieces 20 (counted from the top of the camera) are contacted through respective projections 21 thereof with the same conductive portion of the DX code 9, the DX pieces 20 become conductive so as to generate an ON signal. On the other hand, when the first and second DX pieces 20 are contacted with the non-conductive portion, the DX pieces 20 do not become conductive, thereby generating an OFF signal. A camera controlling part (not illustrated) recognizes the film sensitivity, or the like, based on the ON/OFF signal from the DX pieces 20.

In this embodiment, a backup battery 7 is stored between the third and fourth DX pieces 20 (counted from the top of the camera). The backup battery 7 is in the form of a disc whose front surface and outer circumferential surface serve as electrode surfaces, respectively. The backup battery 7, which is used for driving a clock circuit of a camera, is provided independently of the main battery (not illustrated) for driving a photographing function controlling circuit of the camera.

Figure 3:
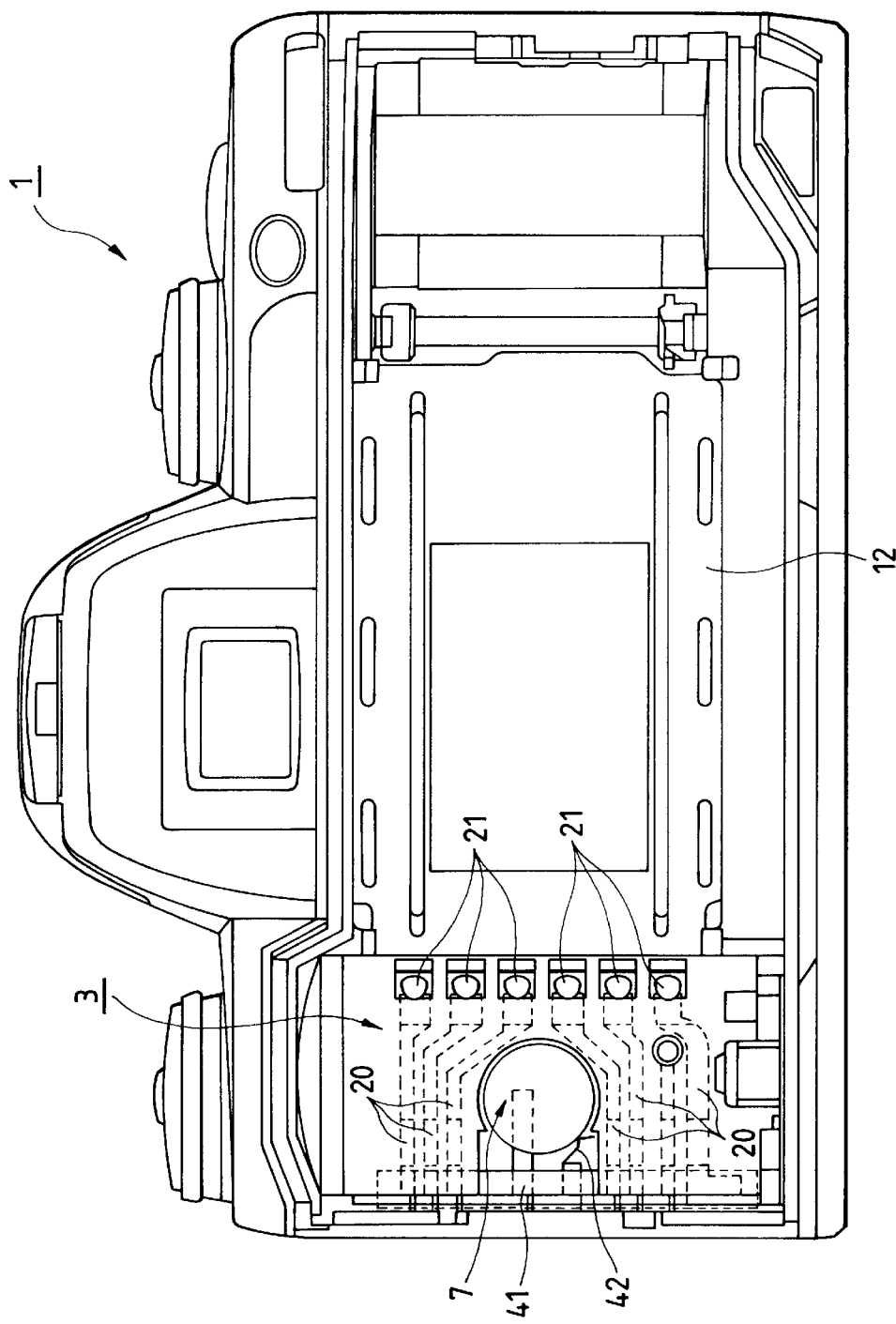
FIG. 3 is a rear view of the camera of FIG. 1.

FIG. 3 is a rear view of the camera 1 (the back lid 11 is detached) The position of the six projections 21 is determined according to the specification of the DX code 9 of the film cartridge 8, and therefore the six projections 21 are arranged at equal intervals vertically. To this end, the distal ends of the DX pieces 20 are juxtaposed at equal intervals vertically.

In order to provide a storing space for the backup battery 7, the first, second and third DX pieces 20 (counted from the top of the camera) are bent upward so that a part of each DX piece 20 extends obliquely upward from the distal end. On the other hand, the first, second and third DX pieces 20 (counted from the bottom of the camera) are bent downward so that a part of each DX piece 20 extends obliquely downward from the distal end. Accordingly, a space for storing the backup battery 7 is provided between the third and fourth DX pieces 20.

Figure 4:
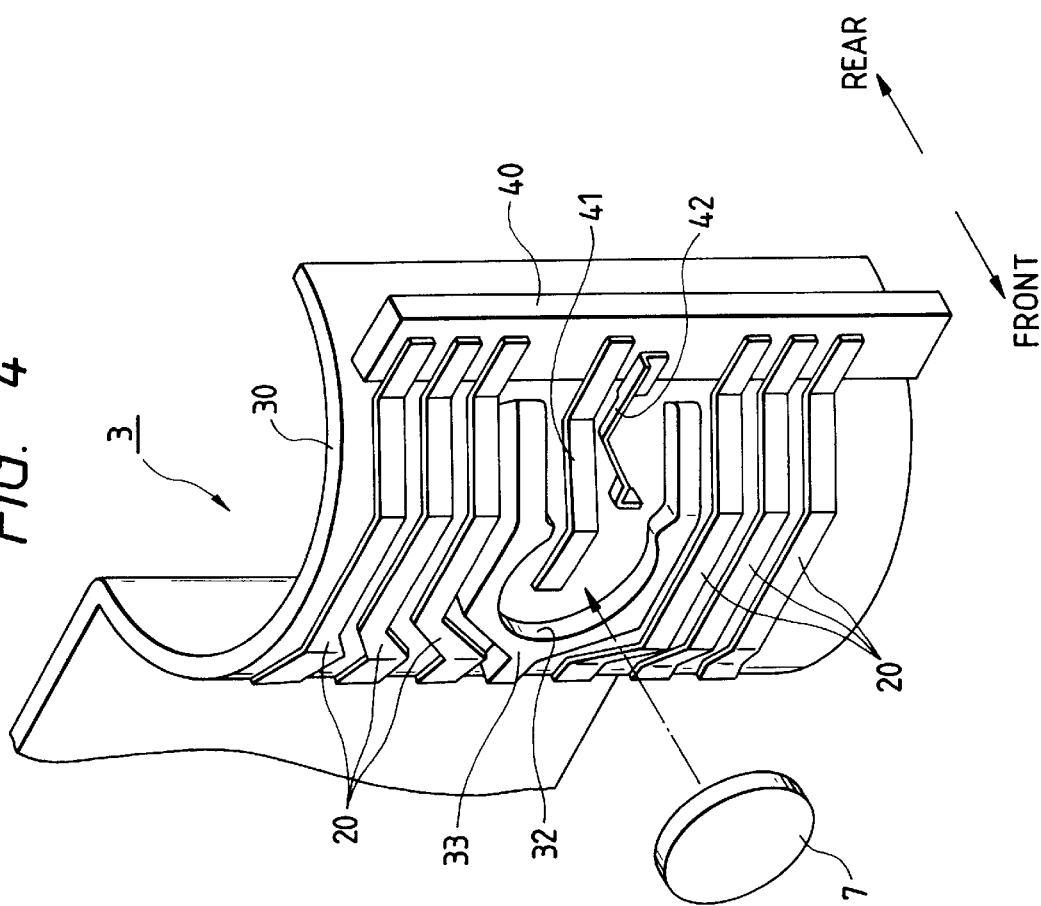
FIG. 4 is a perspective view showing a backup battery storing part.

FIG 4 is a diagram of a holding part of the backup battery 7 viewed from the front side of the wall 30. A frame part 33 having a substantially circular inner circumferential part 32 with a diameter slightly larger than the backup battery 7 is formed on the front surface of the wall 30. The inner circumferential part 32 of the frame part 33 holds the outer circumference of the backup battery 7.

Further, the terminal plate 40 has a "plus" electrode plate 41 for contact with the front surface of the backup battery 7, when the backup battery 7 is mounted in the frame part 33. The "plus" electrode plate 41 is in the form of a strip-like member having one end fixed to the terminal plate 40 and another end elongating to the substantially center part of the frame part 33. Moreover, the terminal plate 40 is provided with a "minus" electrode plate 42 for contact with the outer circumferential surface of the backup battery 7.

When the backup battery 7 is mounted in the frame part 33, the inner circumferential part 32 of the frame part 33 holds the outer circumference of the backup battery 7. The wall 30 of the film chamber 3 and the plus electrode plate 41 respectively support and hold the rear and front sides of the backup battery 7 The front surface of the backup battery 7 contacts the "plus" electrode plate 41, and the outer circumferential surface contacts the "minus" electrode plate 42.

Figure 5:
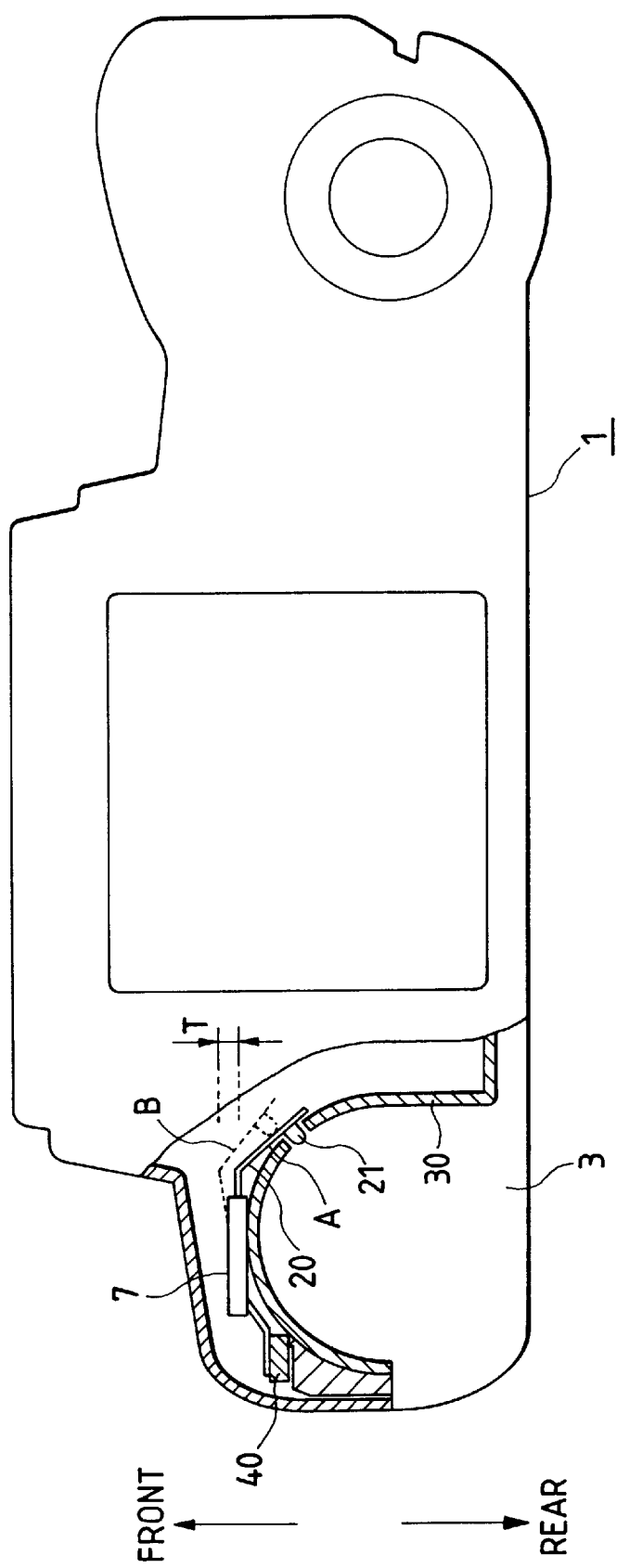
FIG. 5 is a partially broken upper view showing the backup battery storing part of the camera.

FIG. 5 is a plan view of the camera 1 showing the film chamber in cross-section. The DX pieces 20 are flexibly deformable in the direction approaching to or away from the wall 30 so that the projections 21 can be protruded into or retracted from the film chamber 3. That is, the DX pieces 20 are flexibly deformable between the position marked as A in FIG. 5 (at the position closest to the wall 30) and the position marked as B (the position farthest from the wall 30).

The thickness of the backup battery 7 is smaller than the flexure deformation stroke of the DX pieces 20 between A and B. Therefore, the backup battery 7 is stored completely in the space T provided to permit the flexure deformation of the DX pieces 20 Since the backup battery 7 can be stored in the installation space of the DX pieces 20 along the wall 30 of the film chamber 3, an additional space for storing a backup battery, which would otherwise increase the size of the camera, need not be provided Moreover, since the thickness of the backup battery 7 is stored completely within the space that is provided to permit the flexure deformation of the DX pieces 20, the installation space of the DX pieces need not be made deeper. Furthermore, it is also possible to integrally mold the DX pieces 20 and the electrode plates 41, 42.

While the present invention is described as being intended to store a backup battery, the present invention may also hold a main battery of a photographing optical system.

What is claimed is:

1. A battery storing structure for a camera, comprising a plurality of DX pieces adapted to read a DX code on a film cartridge, said pieces being spaced in an axial direction of the film cartridge along a wall of a film chamber of the camera; and wherein two adjacent ones of said DX pieces are configured to store a battery therebetween.

2. The battery storing structure for a camera according to claim 1, wherein said DX pieces are bent in an axial direction of the film cartridge.

3. The battery storing structure for a camera according to claim 1, wherein said DX pieces are flexibly deformable in a direction extending toward and away from the film cartridge in the film chamber.

4. The battery storing structure for a camera according to claim 3, wherein a thickness of the battery is thinner than a deformation stroke of the DX pieces.

5. The battery storing structure for a camera according to claim 1, further comprising:

a first electrode adapted to contact one of a front surface and a rear surface of the battery; and a second electrode adapted to contact an outer circumferential surface of the battery.

6. The battery storing structure for a camera according to claim 5, wherein said first electrode and the wall are configured to respectively hold the front and rear surface of the battery therebetween.

7. The battery storing structure for a camera according to claim 5, wherein the DX pieces and said first and second electrodes are mounted on a common terminal plate.

8. The battery storing structure for a camera according to claim 1, wherein the wall of the film chamber includes a frame part adapted to hold an outer circumference of the battery.

9. A battery storing structure for camera having a wall partially defining a film cartridge, the structure comprising:

a plurality of DX pieces disposed behind the wall, and spaced along a vertical direction with respect to a film cartridge, each said DX piece having a distal end, a proximal end, an intermediate part located between the distal end and the proximal end, and a projection on the distal end, said DX pieces including two adjacent DX pieces, wherein the intermediate portion of one of said two adjacent DX pieces is offset upwardly in the vertical direction with respect to the distal end thereof, and wherein the intermediate portion of the other of said two adjacent DX pieces is offset downwardly in the vertical direction with respect to the distal end thereof;

a frame portion located between said two adjacent DX pieces and adapted to hold a battery therein.

10. The battery storing structure according to claim 9, wherein each of the two adjacent DX pieces has an inclined portion located between the distal end and the intermediate portion.

11. The battery storing structure according to claim 9, wherein the intermediate portion of each of the two adjacent DX pieces is arranged linearly with respect to the proximal end thereof.

12. The battery storing structure according to claim 9, further comprising:

strip member adapted to hold the backup battery in a front-to-rear direction orthogonal to the vertical direction in cooperation with the wall.

13. The battery storing structure according to claim 9, wherein the strip member is located within a space which permits flexible deformation of at least the two adjacent DX pieces in the front-to-rear direction.

* * * * *